United States Patent
Gao et al.

(10) Patent No.: US 9,560,280 B2
(45) Date of Patent: Jan. 31, 2017

(54) IMAGE ACQUISITION METHOD, ELECTRONIC APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Wenjun Gao, Shenzhen (CN); Fei Cheng, Shenzhen (CN); Ming Zhao, Shenzhen (CN); Shizhu Huang, Shenzhen (CN); Na Shao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/718,745

(22) Filed: May 21, 2015

(65) Prior Publication Data

US 2015/0256758 A1 Sep. 10, 2015

Related U.S. Application Data

(63) Continuation of application No. PCT/CN2013/082870, filed on Sep. 3, 2013.

(30) Foreign Application Priority Data

Dec. 4, 2012 (CN) .......................... 2012 1 0512999

(51) Int. Cl.
*H04N 5/232* (2006.01)
*G06F 3/0488* (2013.01)
(Continued)

(52) U.S. Cl.
CPC .......... *H04N 5/23293* (2013.01); *G06F 3/041* (2013.01); *G06F 3/0488* (2013.01);
(Continued)

(58) Field of Classification Search
CPC . H04N 5/23293; H04N 5/23222; G06F 3/041; G06F 3/04845; G06F 3/0488; H04M 2250/52
See application file for complete search history.

(56) References Cited

U.S. PATENT DOCUMENTS

2010/0146459 A1 6/2010 Repka
2010/0166404 A1* 7/2010 Lombardi .............. G03B 17/00 396/89
2011/0035665 A1 2/2011 Kim et al.

FOREIGN PATENT DOCUMENTS

CN 101996038 A 3/2011
CN 102314280 A 1/2012
CN 102541320 A 7/2012

OTHER PUBLICATIONS

International Search Report from International Application No. PCT/CN2013/082870 dated Nov. 14, 2013.

* cited by examiner

*Primary Examiner* — Twyler Haskins
*Assistant Examiner* — Angel L Garces-Rivera
(74) *Attorney, Agent, or Firm* — Marshall, Gerstein & Borun LLP (57) ABSTRACT

The present disclosure provides an image acquisition method, an electronic apparatus, an electronic device, and a storage medium. The method includes: receiving an image function enabling instruction and controlling, according to the image function enabling instruction, a touch display apparatus to enter an image acquisition interface; receiving a touch action on a screen of the image acquisition interface; determining whether image acquisition duration of the touch action on one same area of the screen of the image acquisition interface is greater than or equal to a preset image acquisition preparation time; and controlling an image sens- (Continued)

ing apparatus to acquire a corresponding image if the image acquisition duration of the touch action on the screen of the image acquisition interface is greater than or equal to the image acquisition preparation time.

10 Claims, 6 Drawing Sheets

(51) Int. Cl.
    *G06F 3/0484* (2013.01)
    *G06F 3/041* (2006.01)

(52) U.S. Cl.
    CPC ..... *G06F 3/04845* (2013.01); *H04N 5/23222* (2013.01); *H04M 2250/52* (2013.01)

IMAGE ACQUISITION METHOD, ELECTRONIC APPARATUS, ELECTRONIC DEVICE, AND STORAGE MEDIUM

This application is a continuation of International Application No. PCT/CN2013/082870, filed on Sep. 3, 2013, which claims priority to Chinese Patent Application No. 201210512999.9, filed on Dec. 4, 2012, which is incorporated herein by reference in its entirety.

FIELD OF THE TECHNOLOGY

The present disclosure relates to the field of electronic technologies, and in particular, to an image acquisition method, an electronic apparatus, an electronic device, and a storage medium.

BACKGROUND OF THE DISCLOSURE

At present, with the continuous development of electronic technologies, there are more and more electronic devices that can be configured to photograph, for example, a mobile phone, a digital camera, and a tablet computer. Using a mobile phone as an example, at present, most mobile phones are equipped with a touch screen and a photographing button; when the mobile phone is in a photographing mode, the touch screen may display in real time a preview image for reference to a user; and after selecting a target to photograph, the user may perform a photographing operation by tapping the photographing button.

However, when the user needs to take a selfie by using a rear camera or needs to photograph by raising the mobile phone high above the head top (during photographing in accident onlookers, car exhibition, music concerts, or model photographing), a problem easily occurs that the user cannot tap or even cannot find the photographing button. Moreover, as the size of a smart phone increases continuously, a user cannot conveniently tap a photographing button to start a shutter; in particular, tapping a photographing button becomes harder for a user having small hands or a user that wants to complete a photographing operation with one hand.

Figure 1:
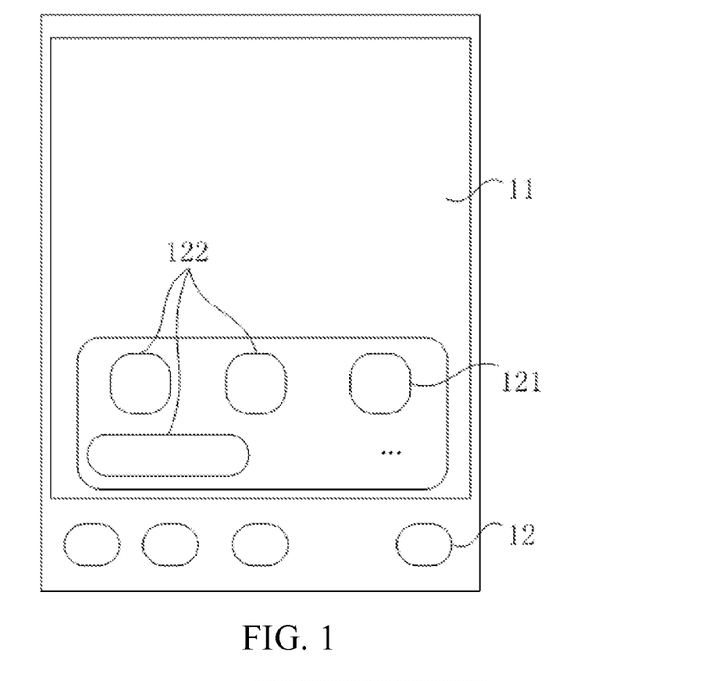
FIG. 1 is a schematic diagram of a photographing device in the existing technology in a set state.

At present, a technical solution to the foregoing defect is to set a touch screen photographing function in a photographing device of a mobile phone, where photographing is performed by tapping a screen after the touch screen photographing function is opened in settings. As shown in a schematic diagram of a photographing device in the existing technology in a set state in FIG. 1, a touch screen 11 and a setting button 12 are included. A user may open a setting interface by pressing the setting button 12, so that a touch screen photographing function key 121 and other functional keys 122 are displayed. However, in the technical solution, the user is required to tap the setting button to select the touch screen photographing function, photographing by tapping a screen easily causes an unintended operation, and the touch screen photographing function conflicts with other functions of the photographing device, for example, when the touch screen photographing function key 121 is in a selected state, some of the other functional keys 122 (for example, an autofocus functional key) is inoperable.

SUMMARY

One objective of the present disclosure is to provide an image acquisition method, which can simplify a setting process of touch screen photographing, provide a faster touch screen photographing manner, improve accuracy of a photographing operation, and expand the application scope of touch screen photographing.

To solve the above problem, the present disclosure provides an image acquisition method, including:

receiving an image function enabling instruction and controlling, according to the image function enabling instruction, a touch display apparatus to enter an image acquisition interface;

receiving a touch action on the image acquisition interface;

determining whether image acquisition duration of the touch action on one same area of the image acquisition interface is greater than or equal to a preset image acquisition preparation time; and controlling an image sensing apparatus to acquire a corresponding image if the image acquisition duration of the touch action on the same area of the image acquisition interface is greater than or equal to the image acquisition preparation time.

Another objective of the present disclosure is to provide an electronic apparatus, which can simplify a setting process of touch screen photographing, provide a faster touch screen photographing manner, improve accuracy of a photographing operation, and expand the application scope of touch screen photographing.

To solve the above problem, the present disclosure provides an electronic apparatus, including:

one or more processors;

a memory; and one or more programs, stored in the memory and configured to be executed by the one or more processors to provide an image acquisition method, the one or more programs being classified according to functions, and including:

a first receiving unit, configured to receive an image function enabling instruction and control, according to the image function enabling instruction, a touch display apparatus to enter an image acquisition interface;

a second receiving unit, configured to receive a touch action on the image acquisition interface;

an image acquisition determining unit, configured to determine whether image acquisition duration of the touch action on one same area of the image acquisition interface is greater than or equal to a preset image acquisition preparation time; and an image acquisition control unit, configured to control an image sensing apparatus to acquire a corresponding image if the image acquisition duration of the touch action on the same area of a screen of the image acquisition interface is greater than or equal to the image acquisition preparation time.

Another objective of the present disclosure is to provide an electronic device, which can simplify a setting process of touch screen photographing, provide a faster touch screen photographing manner, improve accuracy of a photographing operation, and expand the application scope of touch screen photographing.

To solve the above problem, the present disclosure provides an electronic device, including a touch display apparatus, an electronic apparatus, and an image sensing apparatus, a screen of the touch display apparatus including an action capturing area and an animation playing area;

the action capturing area being configured to acquire a touch action and a leave action and send the touch action and the leave action to the electronic apparatus;

the animation playing area being configured to play, according to image acquisition duration of the touch action on one same area of the action capturing area of the screen, an animation for prompting an image acquisition time; and the electronic apparatus including:

a first receiving unit, configured to receive an image function enabling instruction and control, according to the image function enabling instruction, the touch display apparatus to enter an image acquisition interface;

a second receiving unit, configured to receive a touch action on the image acquisition interface;

an image acquisition determining unit, configured to determine whether image acquisition duration of the touch action on one same area of the image acquisition interface is greater than or equal to a preset image acquisition preparation time; and an image acquisition control unit, configured to control the image sensing apparatus to acquire a corresponding image if the image acquisition duration of the touch action on the same area of the image acquisition interface is greater than or equal to the image acquisition preparation time.

Another objective of the present disclosure is to provide a storage medium, which can simplify a setting process of touch screen photographing, provide a faster touch screen photographing manner, improve accuracy of a photographing operation, and expand the application scope of touch screen photographing.

To solve the above problem, the present disclosure provides a storage medium, storing instructions that can be executed by a processor, the processor providing an image acquisition method by executing the instructions, which includes:

receiving an image function enabling instruction and controlling, according to the image function enabling instruction, a touch display apparatus to enter an image acquisition interface;

receiving a touch action on the image acquisition interface;

determining whether image acquisition duration of the touch action on one same area of the image acquisition interface is greater than or equal to a preset image acquisition preparation time; and controlling an image sensing apparatus to acquire a corresponding image if the image acquisition duration of the touch action on the same area of the image acquisition interface is greater than or equal to the image acquisition preparation time.

As compared with the existing technology, according to the present disclosure, a photographing operation can be implemented by directly long pressing a framing area of a touch screen, which requires no mode switching, and can simplify a setting process of touch screen photographing and provide a more convenient touch screen photographing manner; photographing by long pressing can make view finding more stable, which shows more consideration for users having small hands, and in particular, a female user can perform a photographing operation with one hand; and moreover, considerations are given to convenience, efficiency, and stability at the same time and the application scope of touch screen photographing is expanded. In the present disclosure, no matter whether a user takes a selfie by using a rear camera, or needs to photograph by raising a photographing device high during photographing in accident onlookers, car exhibitions, or model photographing, or photographs by using a large-size photographing device with one hand, the user can photograph by directly long pressing a screen, thereby simplifying a photographing operation process, improving accuracy of a photographing operation, and expanding the application scope of touch screen photographing.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

DESCRIPTION OF EMBODIMENTS

Referring to the drawings, same component numerals represent a same component. The principles of the present disclosure are described by using examples implemented in a proper running environment. The following descriptions are specific embodiments of the present invention based on the examples, which should not be regarded as a limitation to other specific embodiments of the present invention that are not described herein in detail.

In the description that follows, the present disclosure will be described with reference to steps and symbolic representations of operations that are performed by one or more computers, unless indicated otherwise. As such, it will be understood that such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the present disclosure is being described in the foregoing context, it is not meant to be limiting as those of skill in the art will appreciate that various of the steps and operation described hereinafter may also be implemented in hardware.

Figure 2:
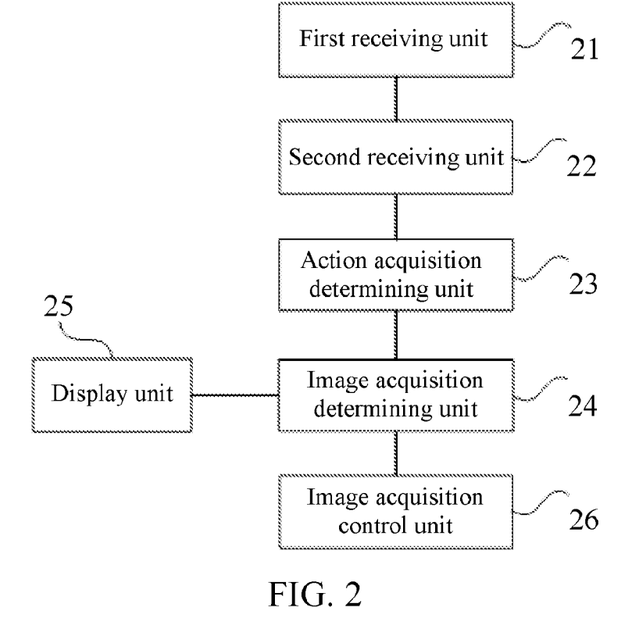
FIG. 2 is a schematic structural diagram of a preferred implementation manner of an electronic apparatus according to the present disclosure.

The present disclosure provides an electronic apparatus. FIG. 2 is a schematic structural diagram of the electronic apparatus in a preferred implementation manner. The electronic apparatus includes one or more processors; a memory; and one or more programs stored in the memory and configured to be executed by one or more processors to provide an image acquisition method. The one or more programs are classified according to functions and include a first receiving unit 21, a second receiving unit 22, an action acquisition determining unit 23, an image acquisition determining unit 24, a display unit 25, and an image acquisition control unit 26.

The first receiving unit 21 is configured to receive an image function enabling instruction and control, according to the image function enabling instruction, a touch display apparatus to enter an image acquisition interface.

The second receiving unit 22 is configured to receive a touch action on a screen of the image acquisition interface.

That is, after the first receiving unit 21 receives the image function enabling instruction and enables an image function of the touch display apparatus, the image acquisition interface is entered directly. Any part on the screen of the image acquisition interface can receive a touch action and a leave action. After one same area of the image acquisition interface of the screen receives the touch action by using the second receiving unit 22 (that is, a long pressing action is performed on the screen), a program of touch screen photographing can be entered directly, where a user does not need to start a setting functional key to set a touch screen photographing function, thereby simplifying a setting process of touch screen photographing.

The action acquisition determining unit 23 is configured to determine whether action acquisition duration of the touch action on the same area of the image acquisition interface is greater than or equal to a preset action acquisition preparation time, where the image acquisition determining unit 24 is executed if the action acquisition duration is greater than or equal to the action acquisition preparation time. The action acquisition preparation time may be set to 0.1 s to 0.3 s according to actual requirements, and preferably is 0.2 s. The action acquisition determining unit 23 is an optional unit and is executed to further improve accuracy of a photographing operation so as to further reduce unintended operations.

After the same area of the screen receives the touch action, an action acquisition preparing state is entered. The action acquisition preparing state has a preset action acquisition preparation time. The action acquisition preparation time may be preset according to actual photographing requirements, to perform a timing operation on the action acquisition preparing state according to the action acquisition preparation time after the same area of the screen receives a touch action, where a timing result is action acquisition duration, so as to determine that a current touch action is a photographing operation, thereby further preventing an unintended operation. When the timing result, that is, action acquisition duration, is less than the action acquisition preparation time, that is, the touch action on the same area is interrupted within the action acquisition preparation time, the action acquisition preparing state is exited and whether a touch action on different areas (for example, a sliding operation) occurs is further determined. If a touch action on different areas occurs, a corresponding event is triggered according to the touch action on different areas. If the action acquisition duration is greater than or equal to the action acquisition preparation time, the image acquisition determining unit 24 is executed.

The image acquisition determining unit 24 is configured to determine whether image acquisition duration of the touch action on the same area of the image acquisition interface is greater than or equal to a preset image acquisition preparation time. If the image acquisition duration is greater than or equal to the image acquisition preparation time, the image acquisition control unit 26 is executed. The image acquisition preparation time may be set to 0.3 s to 1 s according to actual requirements, and preferably is 0.5 s.

The display unit 25 is configured to control the touch display apparatus to display timing prompt information while the image acquisition determining unit 24 is executed. The displaying timing prompt information by the display unit 25 includes: playing an animation for prompting an image acquisition time. For example, a circular ring countdown animation is displayed. A period for the circular ring to rotate one round is equal to the image acquisition preparation time. If the image acquisition duration is greater than or equal to the image acquisition preparation time, a complete countdown animation of circular ring rotation is played. Otherwise, the image acquisition duration stops and playing of the countdown animation of circular ring rotation ends. In addition to the circular ring rotation, the timing prompt information for prompting an image acquisition time may also be circular disk rotation or other visual feedback timing prompt information that can indicate a time progress.

By playing the timing animation, the user can be prompted that the user currently has entered the program of touch screen photographing. If the user does not need to photograph an image in a current framing area, the user cancels the press touch on the touch screen so as to terminate current image acquisition operation, thereby effectively reducing unintended operations.

If the action acquisition determining unit 23 is executed, an image acquisition preparing state is entered after it is determined that the action acquisition duration is greater than or equal to the action acquisition preparation time. If the action acquisition determining unit 23 is not executed, the image acquisition preparing state is entered after the second receiving unit 22 receives the touch action on the same area of the image acquisition interface of the screen. The image acquisition preparing state has a preset image acquisition preparation time. The image acquisition preparation time is preset according to actual photographing requirements. A timing operation is performed on the image acquisition preparing state according to the image acquisition preparation time, where a timing result is image acquisition duration, and at the same time, the user is informed of the timing result by displaying timing information by using the display unit 25, to further determine that a current touch action is a photographing operation, thereby effectively preventing an unintended operation. If the touch action on the same area is not interrupted in the image acquisition preparing state, that is, the timing result in the image acquisition preparing state (the image acquisition duration) is greater than or equal to the image acquisition preparation time, the image acquisition control unit 26 is executed. Otherwise, the image acquisition preparing state is exited (the second receiving unit 22 may be executed again to receive a touch action).

The image acquisition control unit 26 is configured to control an image sensing apparatus to acquire a corresponding image. The image includes a picture or a video.

A preferred implementation manner of an image acquisition device according to the present disclosure is provided below with reference to the accompanying drawings.

Figure 3:
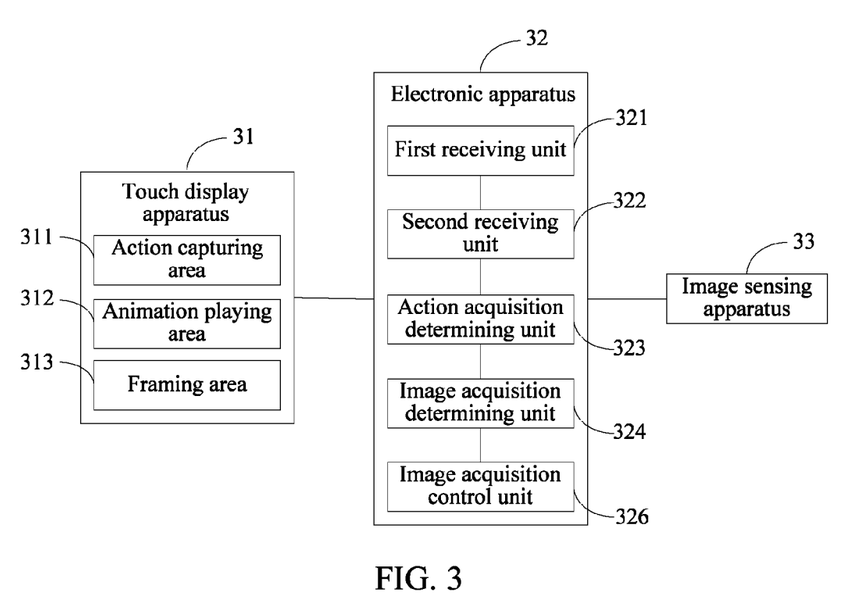
FIG. 3 is a schematic structural diagram of a preferred implementation manner of an electronic device according to the present disclosure.

The present disclosure further provides an electronic device. FIG. 3 is a schematic structural diagram of the electronic device in a preferred implementation manner, including a touch display apparatus 31, an electronic apparatus 32, and an image sensing apparatus 33. The touch display apparatus 31 may use a screen in a form of a liquid crystal display (LCD), an organic light-emitting diode (OLED), or the like, and has a touch sensitive surface. After detecting a touch operation on or near the touch sensitive surface, the touch sensitive surface may transmit the touch operation to a processor (not shown in the figure) of the electronic apparatus 32, so as to determine a type of the touch event. The processor then may provide a corresponding visual output on the screen 31 according to the type of the touch event. The image sensing apparatus 33 may include a sensing element array, a gain-adjustable signal amplifier, an analog/digital signal converter, a control logic, and an input and output interface. The components of the image sensing apparatus 33 may be designed integrally, welded in a hybrid manner, or designed in a systematic package manner. A principle of a sensing element may be any sensing principle, for example, capacitor sensing, electric field and magnetic field, radio frequency, optics, ultrasonic waves, pressure, or infrared ray. The sensing element may be configured on a substrate. The substrate may be made of a semiconductor material such as silicon, or may be made of glass, a polymer, or other insulation materials. The sensing element may be a sensing element in a capacitive form, a pressure form, a temperature difference sensing form, an optical form, an electric field form, an electromagnetic field form, an RF form, an infrared form, a piezoelectric form, an ultrasonic wave form, or other forms.

The screen of the touch display apparatus 31 includes an action capturing area 311 and an animation playing area 312.

The action capturing area 311 is configured to acquire a touch action and a leave action and send the touch action and the leave action to the electronic apparatus 32.

The animation playing area 312 is configured to play, according to image acquisition duration of a touch action on one same area of the action capturing area of the screen, an animation for prompting an image acquisition time.

In another implementation manner, the screen further includes a framing area 313. The framing area 313 is configured to display an image acquired by the image sensing apparatus 33 of the electronic device. The framing area 313 may overlap with the action capturing area 311.

The electronic apparatus 32 includes: a first receiving unit 321, a second receiving unit 322, an image acquisition determining unit 324, and an image acquisition control unit 326.

The first receiving unit 321 is configured to receive an image function enabling instruction and control, according to the image function enabling instruction, the touch display apparatus to enter an image acquisition interface.

The second receiving unit 322 is configured to receive a touch action on the image acquisition interface.

The image acquisition determining unit 324 is configured to determine whether image acquisition duration of a touch action on a same area of the image acquisition interface is greater than or equal to a preset image acquisition preparation time. If the image acquisition duration is greater than or equal to the image acquisition preparation time, the image acquisition control unit 326 is executed. The image acquisition preparation time may be set to 0.3 s to 1 s according to actual requirements, and preferably is 0.5 s.

The image acquisition control unit 326 is configured to control the image sensing apparatus 33 to acquire a corresponding image. The image includes a picture or a video.

In another implementation manner, the electronic apparatus 32 further includes: an action acquisition determining unit 323.

Before the image acquisition determining unit 324 determines whether the image acquisition duration is equal to or greater than the image acquisition preparation time, the action acquisition determining unit 323 determines whether action acquisition duration of the touch action on the same area of the image acquisition interface is greater than or equal to a preset action acquisition preparation time. If the action acquisition duration is greater than or equal to the action acquisition preparation time, the image acquisition determining unit 324 is executed. The action acquisition preparation time may be set to 0.1 s to 0.3 s according to actual requirements, and preferably is 0.2 s.

Figure 4:
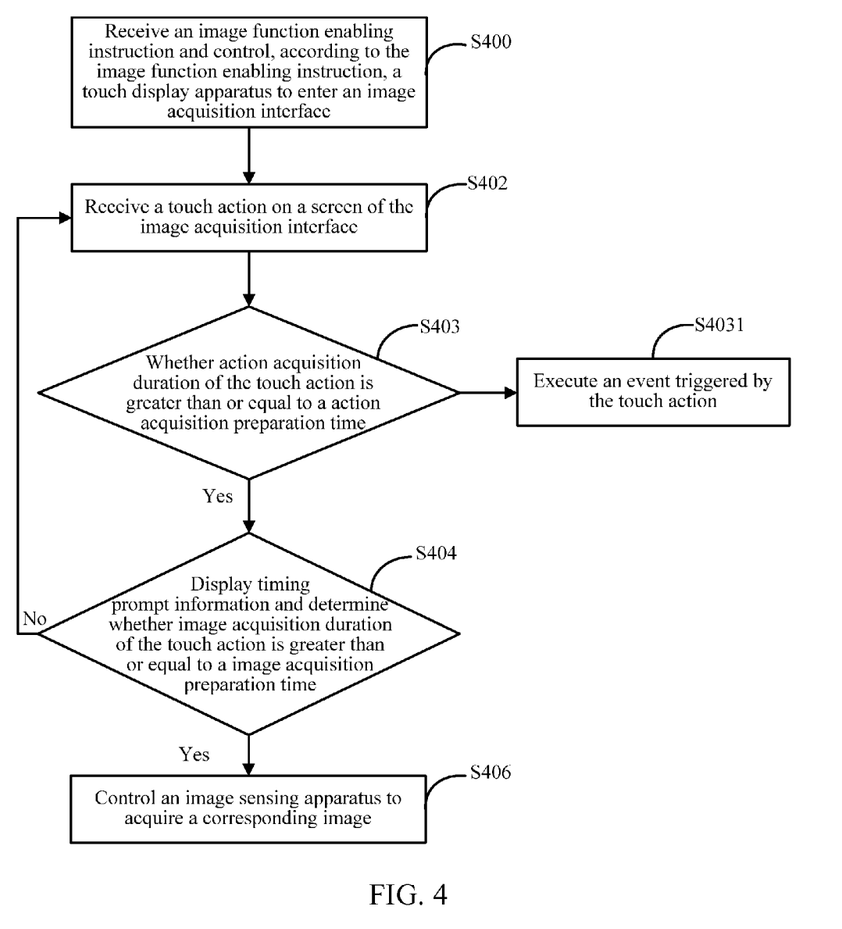
FIG. 4 is a flowchart of a preferred implementation manner of an image acquisition method according to the present disclosure.

The present disclosure further provides an image acquisition method. FIG. 4 is a flowchart of the image acquisition method in a preferred implementation manner. The image acquisition method in this preferred embodiment includes:

Step S400: Receive an image function enabling instruction and control, according to the image function enabling instruction, a touch display apparatus to enter an image acquisition interface.

Step S402: Receive a touch action on a screen of the image acquisition interface.

That is, after a first receiving unit 21 receives the image function enabling instruction and enables an image function of the touch display apparatus, the image acquisition interface is entered directly. Any part on the screen of the image acquisition interface can receive a touch action and a leave action. After one same area of the image acquisition interface of the screen receives the touch action by using a second receiving unit 22, a program of touch screen photographing can be entered directly, where a user does not need to start a setting functional key to set a touch screen photographing function, thereby simplifying a setting process of touch screen photographing. It is found from a survey that, it is difficult for a user to complete a photographing operation by using one hand, of which a major reason is that operating with one hand is not stable and to the hand cannot reach a photographing button. However, according to the present disclosure, the program of touch screen photographing can be entered directly by receiving a touch action on one same area of the screen. Therefore, a faster touch screen photographing manner is provided and the photographing manner by pressing the screen can make framing more stable.

Step S403: Determine whether action acquisition duration of the touch action on one same area of the image acquisition interface is greater than or equal to a preset action acquisition preparation time. If the action acquisition duration is greater than or equal to the action acquisition preparation time, step S404 is performed. The action acquisition preparation time may be set to 0.1 s to 0.3 s according to actual requirements, and preferably is 0.2 s.

After the same area of the screen receives the touch action, an action acquisition preparing state is entered. The action acquisition preparing state has a preset action acquisition preparation time. The action acquisition preparation time may be preset according to actual photographing requirements, to perform a timing operation on the action acquisition preparing state according to the action acquisition preparation time after the same area of the screen receives a touch action, where a timing result is action acquisition duration, so as to determine that a current touch action is a photographing operation, thereby preventing an unintended operation. When the timing result, that is, action acquisition duration, is less than the action acquisition preparation time, that is, the touch action on the same area is interrupted within the action acquisition preparation time, the action acquisition preparing state is exited and step S4031 is performed: Further determine whether a touch action on different areas (for example, a sliding operation) occurs. If a touch action on different areas occurs, a corresponding event is triggered according to the touch action on different areas. If the action acquisition duration is greater than or equal to the action acquisition preparation time, step S404 is performed.

Step S403 is an optional step. Step S403 is performed to further improve accuracy of the photographing operation, to further reduce unintended operations. If step S403 is performed, step S404 is performed after step S403, that is, a corresponding image is acquired after touch screen determining is executed twice. If step S403 is not performed, step S404 is performed after step S402, that is, the image sensing apparatus 33 is controlled to acquire a corresponding image after touch screen determining is executed once.

Step S404: Control a touch display apparatus 31 to display timing prompt information and determine whether image acquisition duration of the touch action on the same area of the image acquisition interface is greater than or equal to a preset image acquisition preparation time. If the image acquisition duration is greater than or equal to the image acquisition preparation time, step S406 is performed. The image acquisition preparation time may be set to 0.3 s to 1 s according to actual requirements, and preferably is 0.5 s.

The timing prompt information may be picture, text, audio, or animation information. The step of displaying timing prompt information includes: playing an animation for prompting an image acquisition time. For example, a circular ring countdown animation is displayed. A period for the circular ring to rotate one round is equal to the image acquisition preparation time. If the image acquisition duration is greater than or equal to the image acquisition preparation time, a complete countdown animation of circular ring rotation is played. Otherwise, the image acquisition duration stops and playing of the countdown animation of circular ring rotation ends. In addition to the circular ring rotation, the timing prompt information for prompting an image acquisition time may also be circular disk rotation or other visual feedback timing prompt information that can indicate a time progress.

By playing the timing animation, a user can be prompted that the user currently has entered the program of touch screen photographing. If the user does not need to photograph an image in a current framing area, the user cancels the press touch on the touch screen so as to terminate current image acquisition operation, thereby effectively reducing unintended operations.

If step S403 is performed, an image acquisition preparing state is entered after it is determined that the action acquisition duration is greater than or equal to the action acquisition preparation time and before a corresponding image is acquired. If step S403 is not performed, the image acquisition preparing state is entered after the same area of the image acquisition interface of the screen receives the touch action. The image acquisition preparing state has a preset image acquisition preparation time. The image acquisition preparation time is preset according to actual photographing requirements. A timing operation is performed on the image acquisition preparing state according to the image acquisition preparation time, where a timing result is image acquisition duration, and at the same time, the user is informed of the timing result by displaying timing information, to further determine that a current touch action is a photographing operation, thereby effectively preventing an unintended operation. If the touch action on the same area is not interrupted in the image acquisition preparing state, that is, the timing result in the image acquisition preparing state is greater than or equal to the image acquisition preparation time, step S406 is performed. Otherwise, the image acquisition preparing state is exited (step S402 is performed again to receive a touch action).

Step S406: Control an image sensing apparatus 33 to acquire a corresponding image. The image includes a picture or a video.

According to the foregoing method, it is not required to perform optional setting on touch screen photographing, a setting process of touch screen photographing is simplified, a faster touch screen photographing manner is provided, accuracy of a photographing operation is improved, and the application scope of touch screen photographing is expanded.

Next, a preferred embodiment of the foregoing technical solution is provided below with reference to the accompanying drawings.

Figure 5:
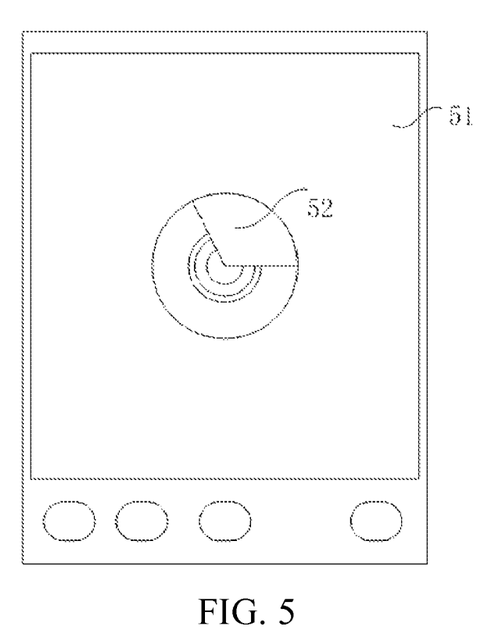
FIG. 5 is a schematic diagram of displaying timing prompt information in an embodiment of the image acquisition method according to the present disclosure.
Figure 6:
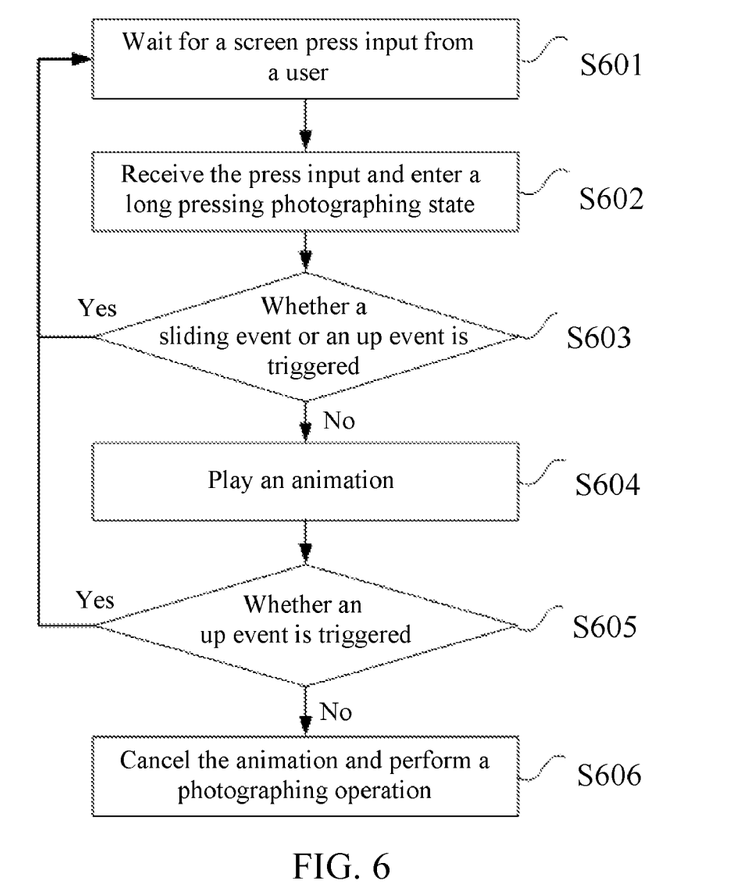
FIG. 6 is a flowchart of an image acquisition method in an embodiment of the image acquisition method according to the present disclosure.

Referring to FIG. 5 and FIG. 6, FIG. 5 is a schematic diagram of displaying timing prompt information of the present disclosure in this embodiment, and FIG. 6 is a flowchart of an image acquisition method of the present disclosure in this embodiment. In FIG. 5, after an image function enabling instruction is received and an image function is enabled, an image acquisition interface is entered directly. Touch screen photographing may be implemented by long pressing a framing area 51, where no mode switching is not required. After the framing area 51 is long pressed, an animation playing area 52 displays timing prompt information, for example, a circular ring countdown is used, and a photographing operation is performed after the circular ring rotates one round, where the user may cancel this photographing operation by releasing the hand before the circular ring finishes one round.

In FIG. 6, step S601: Wait for a screen press input from a user. Step S602: When the user presses a touch screen, the screen receives the press input and enters a long pressing photographing state. Step S603: Wait within a preset time (for example, 200 ms), and if a sliding event is triggered, exit the long pressing photographing state and enter a screen sliding logic; or if an up event is triggered, exit the long pressing photographing state, end a current photographing operation, and go back to step S601 to continue waiting. Step S604: If no event is triggered within the preset time, play an animation (for example, a long pressing animation in a circular ring countdown form). Step S605: If an up event is triggered in the playing process, exit the long pressing photographing state, end the current photographing operation, and go back to step S601 to continue waiting. Step S606: After playing of the animation is completed, cancel the animation and perform the photographing operation.

Persons of ordinary skill in the art should understand that, all or some of the processes in the method according to the embodiments may be implemented by a computer program instructing relevant hardware. The program may be stored in a computer readable storage medium. When the program is executed, the processes of the method in the embodiments are performed. The storage medium may be a magnetic disk, an optical disc, a read-only memory (ROM), a random access memory (RAM), or the like.

According to the image acquisition method, the electronic apparatus, the electronic device, and the storage medium of the present disclosure, an image acquisition operation is implemented by receiving a touch action on a framing area of a touch screen, which requires no mode switching, and can simplify a setting process of touch screen photographing, and provide a faster touch screen photographing manner. In the present disclosure, no matter whether a user takes a selfie by using a rear camera, or needs to photograph by raising a photographing device high during photographing in accident onlookers, car exhibitions, or model photographing, or photographs by using a large-size photographing device with one hand, the user can photograph by directly long pressing a screen, thereby simplifying a photographing operation process, improving accuracy of a photographing operation, and expanding the application scope of touch screen photographing.

The terms such as "component", "module", "system", and "interface" used in this application generally are intended to refer to computer related entities: hardware, a combination of hardware and software, software, and software in execution. For example, a component may be, but not limited to, a progress running in a processor, a processor, an object, an executable application, an executed thread, a program, and/or a computer. According to the drawings, an application running on a controller and the controller both may be components. One or more components may exist in an executed progress and/or thread, and the component may also be located in one computer and/or be distributed between two or among more computers.

Moreover, the claimed subject may be implemented by using standard programming and/or an engineering technology to produce software, firmware, hardware, or any other combination thereof, to control a computer to implement a method, an apparatus, or an article of manufacture of the disclosed subject. The term "article of manufacture" used in the specification is intended to encompass a computer program accessible from any computer readable device, carrier, or medium. Certainly, a person skilled in the art may be aware that modifications may be performed on the configuration without departing from the scope and spirit of the subject required to be protected.

Figure 7:
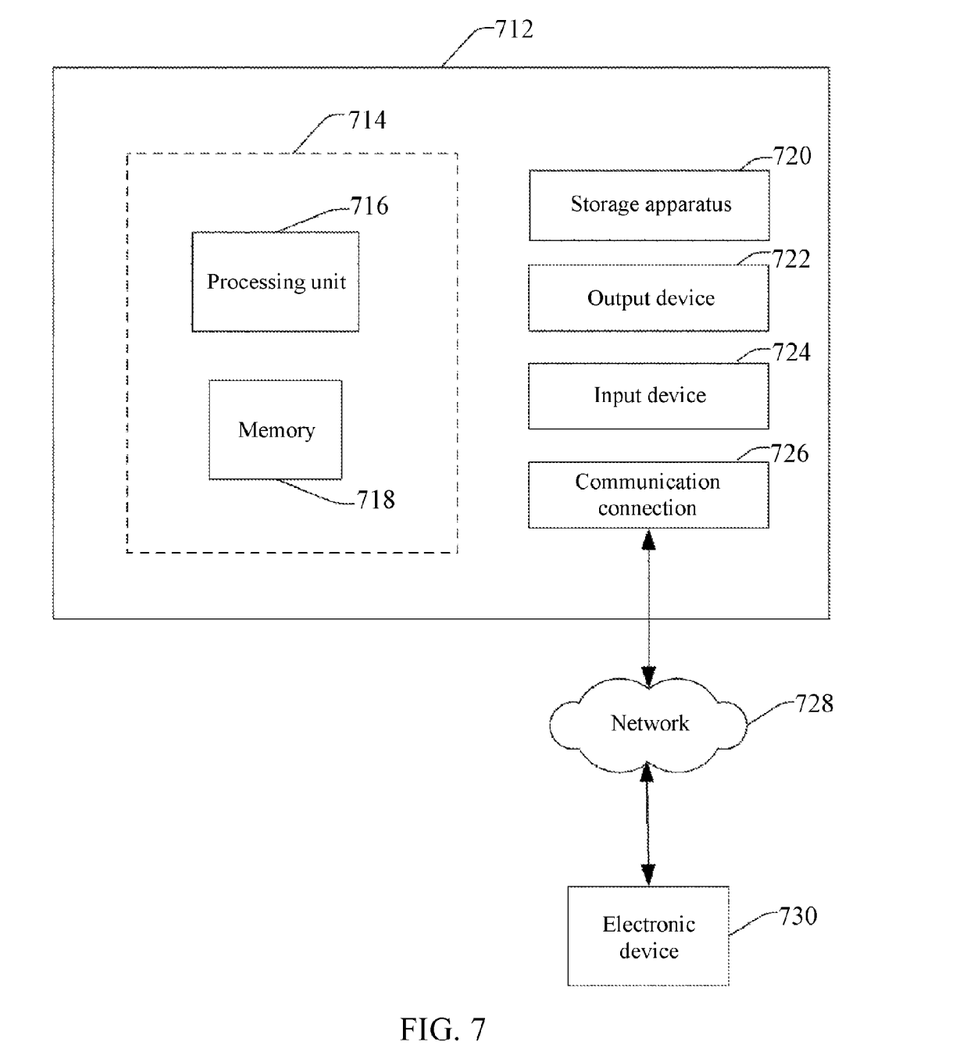
FIG. 7 is a schematic structural diagram of a working environment of an electronic device according to the present disclosure.

FIG. 7 and subsequent discussion provide a brief and generalized description of the working environment for implementing the electronic device of the present disclosure. The working environment of FIG. 7 is only an instance of a proper working environment and is not intended to provide any suggestion nor impose any limitation to the scope of the use or functions of the working environment. An electronic device instance 712 includes, but is not limited to, a personal computer, a server computer, a handheld or laptop device, a mobile device (for example, a mobile phone, a personal digital assistant (PDA), or a media player), a multiprocessor system, a consumer electronic device, a small-sized computer, a large scale computer, and a distributed computing environment including any one of the foregoing systems or devices.

Although not required, the embodiments are described in a general background that "computer readable instructions" are executed by one or more electronic devices. The computer readable instructions may be distributed by means of a computer readable medium (discussed below). The computer readable instructions may be implemented as program modules, such as functions, objects, application programming interfaces (API), data structures for executing specific tasks or implementing specific abstract data types. Particularly, the functions of the computer readable instructions may be randomly combined or distributed in various environments.

FIG. 7 shows an instance including the electronic device 712 in one or more embodiments of the image acquisition method of the present disclosure. In one configuration, the electronic device 712 includes at least one processing unit 716 and a memory 718. According to specific configurations and types of the electronic device, the memory 718 may be volatile (for example, a RAM), non-volatile (for example, a ROM or a flash memory), or a combination of the two. The configuration is shown by a dashed line 714 in FIG. 7.

In another embodiment, the electronic device 712 may include additional features and/or functions. For example, the device 712 may further include an additional storage apparatus (which is, for example, removable and/or non-removable), which includes, but is not limited to, a magnetic storage apparatus, an optical storage apparatus, and the like. The additional storage apparatus is shown as a storage apparatus 720 in FIG. 7. In an embodiment, the computer readable instructions for implementing one or more embodiments in the specification may be stored in the storage apparatus 720. The storage apparatus 720 may further store other computer readable instructions for implementing an operating system, an application program, and the like. The computer readable instructions may be loaded into the memory 718 and executed by, for example, the processing unit 716.

The term "computer readable medium" used in the specification includes a computer storage medium. The computer storage medium includes volatile and non-volatile, and removable and non-removable media implemented by using any method or technology and configured to store computer readable instructions, data, or other information. The memory 718 and the storage apparatus 720 are instances of the computer storage medium. The computer storage medium includes, but is not limited to, a RAM, a ROM, an EEPROM, a flash memory or other storage technologies, a CD-ROM, a digital universal disk (DVD) or other optical storage apparatuses, a cassette, a magnetic tape, a magnetic disk storage apparatus or other magnetic storage devices, or any other medium that can store required information and can be accessed by the electronic device 712. Any one of the computer storage media may be a part of the electronic device 712.

The electronic device 712 may further include a communication connection 726 that enables communication between the electronic device 712 and other devices. The communication connection 726 may include, but is not limited to, a modem, a network interface card (NIC), an integrated network interface, a radio frequency transmitter/receiver, an infrared port, a universal serial bus (USB) connection or other interfaces for connecting the electronic device 712 to other electronic devices. The communication connection 726 may include a wired connection or a wireless connection. The communication connection 726 may transmit and/or receive communication media.

The term "computer readable medium" may include a communications medium. The communications medium particularly includes computer readable instructions or other data in "modulated data signals" such as carriers or other transmission mechanisms, and includes any information delivery medium. The term "modulated data signals" may include such signals: one or more features of the signals is set or changed by encoding information into the signals.

The electronic device 712 may include an input device 724, such as a keyboard, a mouse, a pen, a voice input device, a touch input device, an infrared camera, a video input device and/or any other input device. The device 712 may also include an output device 722, such as one or more displays, a loudspeaker, a printer, and/or any other output device. The input device 724 and the output device 722 may be connected to the electronic device 712 via wired connection, wireless connection, or any combination of the two. In an embodiment, an input device or an output device from another electronic device may be used as the input device 724 or the output device 722 of the electronic device 712.

The components of the electronic device 712 may be connected via various interconnects (for example, a bus). The interconnects may include a peripheral component interconnect (PCI) (for example, a fast PCI), a USB, a fire wire (IEEE 1394), an optical bus structure, or the like. In another embodiment, the components of the electronic device 712 may be interconnected through a network. For example, the memory 718 may include a plurality of physical memory units that are located at different physical locations and interconnected through a network.

Persons skilled in the art know that the storage device for storing computer readable instructions may be distributed in different networks. For example, an electronic device 730 which can be accessed through a network 728 may store computer readable instructions for implementing one or more embodiments provided in the present disclosure. The electronic device 712 may access the electronic device 730 and download some or all of the computer readable instructions for execution. Alternatively, the electronic device 712 may download a plurality of computer readable instructions as required, or some instructions may be executed at the electronic device 712 and some instructions may be executed at the electronic device 730.

The specification provides various operations in the embodiments. In an embodiment, the one or more operations may constitute one or more computer readable instructions stored in a computer readable medium, which, when executed by an electronic device, cause a computer device to execute the operation. The order for describing some or all operations should not be interpreted as implying an order of these operations. Persons skilled in the art may understand that there is an alternative order having the advantages of the specification. Moreover, it should be understood that not all operations must be performed in each embodiment provided in the specification.

Moreover, the word "preferred" used in the specification is intended to refer to an instance, an example, or an illustration. Any aspect or design described as "preferred" in the specification is not necessarily be construed as advantageous over other aspects or designs. Rather, the word "preferred" is used to put forward a concept in a specific manner. For example, the term "or" used in this application is intended to mean an inclusive "or" rather than an exclusive "or". That is, unless specified otherwise or clear from the context, "X uses A or B" refers to any of natural inclusive permutations. That is, if X uses A, X uses B, or X uses both A and B, "X uses A or B" is satisfied in any one or the foregoing examples.

Moreover, although the present disclosure is shown and described by using one or more implementation manners, persons skilled in the art may conceive of equivalent variants and modifications based on reading and understanding of the specification and the accompanying drawings. The present disclosure includes all such variations and modifications, which is only limited by the scope of the appended claims. In particular regard to the various functions performed by the foregoing components (such as elements and resources), terms used to describe such components are intended to correspond to any component (unless indicated otherwise) performing specified functions of the components (for example, the components are equivalent in functions), even though structures of the functions are not equivalent to the disclosed structures of functions in the exemplary implementation manners in the present disclosure shown in the specification. Besides, although the specific feature of the present disclosure has been disclosed in only one of several implementation manners, this feature can be combined with one or more other features of other implementation manners that are desirable for and advantageous to a given or specific application. Moreover, for the terms "include", "have", "contain" or variations thereof being used in specific implementation manners or claims, the terms are intended to be inclusive in a similar manner to that of the term "comprise".

To sum up, although the present disclosure has been disclosed above through the preferred embodiments, the preferred embodiments are not intended to limit the present disclosure. Persons skilled in the art may make variations and modifications without departing from the spirit and scope of the present disclosure. Therefore, the protection scope of the present disclosure should be subject to the appended claims.

What is claimed is:

1. An image acquisition method, comprising:
   receiving an image function enabling instruction and controlling, according to the image function enabling instruction, a touch display apparatus to enter an image acquisition interface;
   receiving a touch action on the image acquisition interface;
   determining whether action acquisition duration of the touch action on one same area of the image acquisition interface is greater than or equal to a preset action acquisition preparation time;
   if the action acquisition duration of the touch action on the same area of the image acquisition interface is greater than or equal to the action acquisition preparation time, determining whether image acquisition duration of the touch action on the same area of the image acquisition interface is greater than or equal to a preset image acquisition preparation time;
   controlling an image sensing apparatus to acquire a corresponding image if the image acquisition duration of the touch action on the same area of the image acquisition interface is greater than or equal to the image acquisition preparation time; and
   performing the receiving the touch action on the image acquisition interface of the touch display apparatus again if the image acquisition duration of the touch action on the same area of the image acquisition interface is less than the image acquisition preparation time.

2. The image acquisition method according to claim 1, wherein during the step of determining whether image acquisition duration of the touch action on one same area of the image acquisition interface is greater than or equal to a preset image acquisition preparation time, the method further comprises:
   controlling the touch display apparatus to display timing prompt information.

3. The image acquisition method according to claim 2, wherein the step of controlling the touch display apparatus to display timing prompt information comprises:
   controlling, according to the image acquisition duration of the touch action on the same area of the image acquisition interface, the touch display apparatus to display an animation for prompting an image acquisition time.

4. The image acquisition method according to claim 1, wherein if the action acquisition duration of the touch action on the same area of the image acquisition interface is less than the action acquisition preparation time, an event triggered by the touch action is executed.

5. An electronic apparatus, comprising:
one or more processors;
a memory; and
one or more programs, stored in the memory and configured to be executed by the one or more processors to provide an image acquisition method, the one or more programs being classified according to functions, and comprising:
a first receiving unit, configured to receive an image function enabling instruction and control, according to the image function enabling instruction, a touch display apparatus to enter an image acquisition interface;
a second receiving unit, configured to receive a touch action on the image acquisition interface;
an action acquisition determining unit, configured to determine whether action acquisition duration of the touch action on the same area of the image acquisition interface is greater than or equal to a preset action acquisition preparation time;
an image acquisition determining unit, configured to determine whether image acquisition duration of the touch action on the same area of the image acquisition interface is greater than or equal to a preset image acquisition preparation time if the action acquisition duration of the touch action on the same area of the image acquisition interface is greater than or equal to the action acquisition preparation time;
an image acquisition control unit, configured to control an image sensing apparatus to acquire a corresponding image if the image acquisition duration of the touch action on the same area of a screen of the image acquisition interface is greater than or equal to the image acquisition preparation time; and if the image acquisition duration of the touch action on the same area of the image acquisition interface is less than the image acquisition preparation time, the second receiving unit is executed; and
a display unit, configured to control the touch display apparatus to display timing prompt information while the image acquisition determining unit is executed.

6. The electronic apparatus according to claim 5, wherein the display unit is configured to control, according to the image acquisition duration of the touch action on the same area of the image acquisition interface, the touch display apparatus to play an animation for prompting an image acquisition time.

7. The electronic apparatus according to claim 5, wherein if the action acquisition determining unit determines that the action acquisition duration of the touch action on the same area of the image acquisition interface is less than the action acquisition preparation time, the electronic apparatus executes an event triggered by the touch action.

8. An electronic device, comprising a touch display apparatus, an electronic apparatus, and an image sensing apparatus, a screen of the touch display apparatus comprising an action capturing area and an animation playing area;
the action capturing area being configured to acquire a touch action and a leave action and send the touch action and the leave action to the electronic apparatus;
the animation playing area being configured to play, according to image acquisition duration of the touch action on one same area of the action capturing area of the screen, an animation for prompting an image acquisition time; and
the electronic apparatus comprising:
a first receiving unit, configured to receive an image function enabling instruction and control, according to the image function enabling instruction, the touch display apparatus to enter an image acquisition interface;
a second receiving unit, configured to receive a touch action on the image acquisition interface;
an action acquisition determining unit, configured to determine whether action acquisition duration of the touch action on one same area of the image acquisition interface is greater than or equal to a preset action acquisition preparation time;
an image acquisition determining unit, configured to determine whether image acquisition duration of the touch action on the same area of the image acquisition interface is greater than or equal to a preset image acquisition preparation time if the action acquisition duration of the touch action on the same area of the image acquisition interface is greater than or equal to the action acquisition preparation time; and
an image acquisition control unit, configured to control the image sensing apparatus to acquire a corresponding image if the image acquisition duration of the touch action on the same area of the screen of the image acquisition interface is greater than or equal to the image acquisition preparation time; and if the image acquisition duration of the touch action on the same area of the image acquisition interface is less than the image acquisition preparation time, the second receiving unit is executed;
wherein the screen further comprises a framing area, wherein
the framing area is configured to display the image acquired by the image sensing apparatus.

9. The electronic device according to claim 8, wherein the framing area overlaps with the action capturing area.

10. The electronic device according to claim 8, wherein if the action acquisition determining unit determines that the action acquisition duration of the touch action on the same area of the image acquisition interface is less than the action acquisition preparation time, the electronic apparatus executes an event triggered by the touch action.

* * * * *